United States Patent
Boge et al.

(10) Patent No.: US 7,682,675 B2
(45) Date of Patent: Mar. 23, 2010

(54) SELF-ADHESIVE SEALING TAPE FOR SEALING THE PASSAGES OF CONSTRUCTION UNITS THROUGH PLASTIC FOILS LINING ROOFS

(75) Inventors: Birgit Boge, Mannheim (DE); Wilhelm Gröner, Schriesheim (DE)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 12/025,348

(22) Filed: Feb. 4, 2008

(65) Prior Publication Data

US 2008/0124506 A1     May 29, 2008

Related U.S. Application Data

(63) Continuation of application No. 10/493,134, filed on Sep. 16, 2004, now abandoned.

(51) Int. Cl.
- B32B 9/00 (2006.01)
- B32B 33/00 (2006.01)
- B32B 7/12 (2006.01)
- B32B 15/04 (2006.01)

(52) U.S. Cl. .............. 428/40.1; 428/41.3; 428/41.5; 428/41.7; 428/343; 428/354

(58) Field of Classification Search .......... 428/40.1, 428/41.3, 41.5, 41.7, 343, 354, 356
See application file for complete search history.

(56) References Cited

U.S. PATENT DOCUMENTS

| 2,647,850 | A |   | 8/1953 | Reinhard |          |
|-----------|---|---|--------|----------|----------|
| 4,595,615 | A | * | 6/1986 | Cohen    | 428/34.2 |
| 5,006,401 | A |   | 4/1991 | Frank    |          |

FOREIGN PATENT DOCUMENTS

| DE | 19533090  | 3/1997  |
| DE | 29615131  | 1/1998  |
| GB | 2105614   | 3/1983  |
| JP | 61275371  | 12/1986 |

* cited by examiner

Primary Examiner—Patricia L Nordmeyer
(74) Attorney, Agent, or Firm—Price, Heneveld, Cooper, DeWitt & Litton, LLP

(57) ABSTRACT

A self-adhesive flexible sealing tape, especially on a butyl or acrylic base, possibly a butyl rubber base, intended for sealing purposes and so designed that both the sealing tape and the carrier foil applied to the sealing tape are capable of being stretched, thus enabling the carrier tape to follow the stretching state of the sealing tape.

39 Claims, 1 Drawing Sheet

Figure 1:
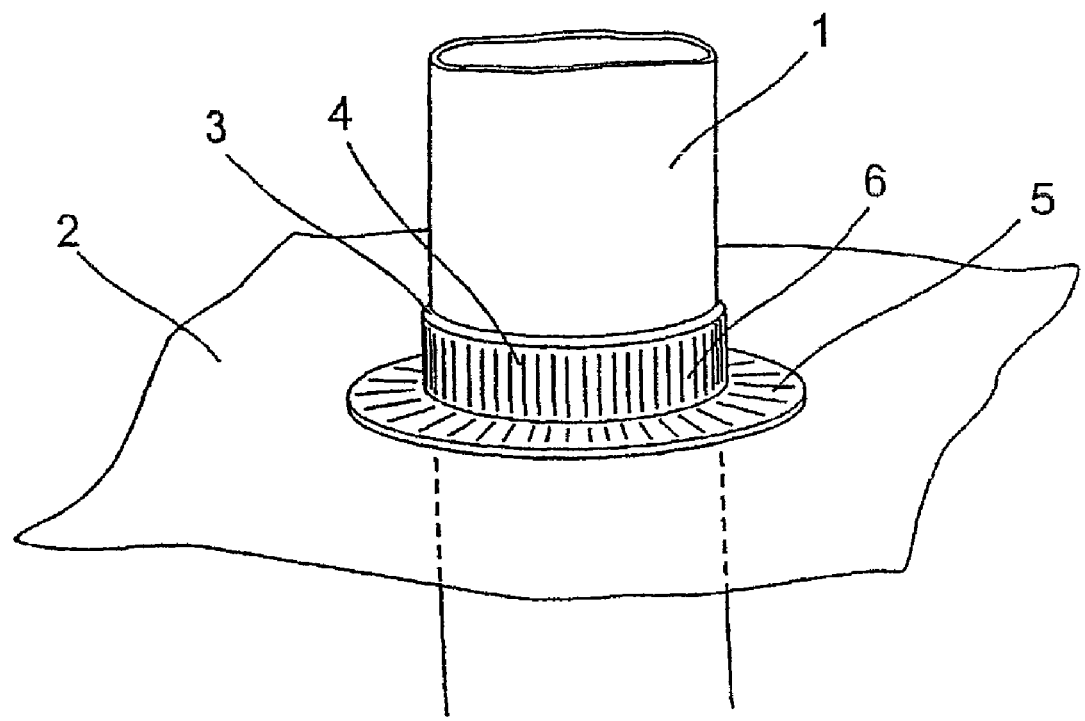

SELF-ADHESIVE SEALING TAPE FOR SEALING THE PASSAGES OF CONSTRUCTION UNITS THROUGH PLASTIC FOILS LINING ROOFS

CROSS-REFERENCE TO RELATED APPLICATION

This application is a continuation of U.S. patent application Ser. No. 10/493,134 filed Sep. 16, 2004 now abandoned entitled SELF-ADHESIVE SEALING TAPE FOR SEALING THE PASSAGES OF CONSTRUCTION UNITS THROUGH PLASTIC FOILS LINING ROOFS.

SUMMARY OF THE INVENTION

The present invention concerns a self-adhesive sealing tape.

It is well known that roofs, especially pitched roofs, but also the walls of buildings are thermally insulated by means of the application of mineral wool products or other heat insulation materials between rafters and/or beams. When this is done, it is generally necessary to cover these materials with a plastic foil to act as a vapor barrier and constitute an airtight covering. On the other hand, local passages have also to be provided in order to permit leads, cables and pipes to pass through the foil. It is therefore necessary for such passages of pipes through vapor barrier foils or roofing felts to be appropriately sealed. It is a common practice to use adhesive or sealing tapes for this purpose.

Such sealing tapes are usually formed on a plastic base, especially made of plastic material on a butyl rubber base. This material confers self-adhesive properties upon the sealing tape, so that for the purposes of storage and use, a foil is normally applied to overlie and cover the sealing tape on both sides. Known sealing tapes for making good the passages of pipes through vapor barrier foils are thus covered by a plastic and in most cases transparent foil applied to one side, while the other and opposite side of the tape is covered by a peel-off foil that is perforated at the center, siliconized transfer paper for example, which prevents successive layers of the tape from sticking to each other when the tape is wound onto a roll. When the sealing tape is used, it is generally folded along the middle and one half of the peel-off foil is then removed. Thereafter, the longitudinal half from which the foil has been removed is manually formed into a rosette, the other half of the peel-off foil is removed and the sealing tape is then made to adhere to the pipe with this longitudinal half. To this end the user will previously have prepared a section of the sealing tape having a length corresponding to the pipe circumference. At the time the tape is made to stick to the pipe, the previously formed rosette is also pressed against the vapor barrier foil and made to adhere to it. Since the longitudinal half of the tape that does not stick to the barrel jacket of the pipe extends in a more or less radial direction therefrom, this means that the area of contact with the vapor barrier foil is larger than the original area of the tape, so that the tape must first be stretched in this area. This is possible when the chosen sealing tape is made of plastic material on a butyl rubber base, because these tapes have a substantial component of plastic material, so that the sealing tape, following the radial extension, can be appropriately stretched in the radial direction. In actual practice, however, the known sealing tapes are associated with the drawback that, given the multi-layer structure of the sealing tape, which consists of carrier and foil, the stretching is adversely affected by the existence of tensions and deformations, which have the effect that the adhesion of the sealing tape to the vapor barrier foil and the barrel jacket of the pipe may come apart at least over part of the area. This is due, above all, to the fact that especially the plastic foil will tend to warp and form folds, so that the deformable sealing tape will become detached from the vapor barrier foil in at least some sections. Local leaks may therefore form, especially in the area of such warps and folds, so that the vapor barrier will no longer be airtight. Furthermore, the crumpled and/or folded sealing tape will give rise to a poor appearance and convey the impression of poor and careless workmanship in creating and sealing the passage of the pipe through the vapor barrier foil. Lastly, the adhesive capacity of the longitudinal half formed into a rosette will be adversely affected when this longitudinal half without a peel-off foil is manually stretched.

The present invention therefore sets out to introduce some simple measures that will render possible the reliable sealing of the passages of pipes through vapor barrier foils and the like, while yet keeping the actual application extremely simple.

According to the invention, this aim is achieved by means of the features set out in the characterizing part of claim 1 hereinbelow, while useful further developments of the invention are characterized by the features described in the various dependent claims.

In accordance with the invention, given a sealing tape that is formed on a butyl or an acrylic base, especially on a butyl rubber base, said base being covered on one side by a plastic foil that serves as carrier foil and on the opposite side by a peel-off foil, said carrier foil being made to be stretchable and this in such a manner as to enable the carrier foil to follow the enlargement and/or stretching of the section of the sealing tape that—in order to make said sealing tape adhere to the flat vapor barrier foil—is bent in the manner of a flange, that is to say, the carrier foil is enabled to follow the stretched state that has to be attained if the sealing tape is to adhere to the flat vapor barrier foil and, what is more, will permanently maintain this adhesion. This prevents the warping of the carrier foil and the formation of folds and this, in turn, not only confers an unobjectionable appearance upon the sealed passage, but also prevents the stretched sealing tape from becoming detached from the vapor barrier foil, thus preventing even a partial and autonomous peeling in the absence of external influences. In a very simple manner it thus becomes possible to assure a reliable and permanent seal even in the case of very complex pipe passages.

To this end it will be helpful not only if a tape with plastoelastic characteristics and a high plastic component is used as sealing tape and, further, if the stretching capacity of the carrier foil matches the stretching capacity of the sealing tape, especially if it is made equal to it.

Preferably, the stretchable carrier foil will be made of plastic material, especially transparent plastic material and, preferably, of polyamide.

In a particularly appropriate embodiment of the invention, the carrier foil is designed for a predetermined thickness, which will be in the range between 15 and 30 µm, especially between 17 and 20 µm, and preferably of the order of 20 µm. Such a design of the protective foil assures that the stretching capacity of the protective foil will be in line will be in line with the stretching capacity of the sealing tape, so that it will permanently follow the latter when it is radially enlarged while it is being made to adhere to the vapor barrier foil. Such a design makes it possible for the adhesive or sealing tape to be appropriately stretchable even when it is stretched in combination with the carrier foil on one side and will not tear even when it is stretched up 100%. Preferably sealing tape and carrier foil will here by designed for a stretching capacity in the range between 50 and 100%, especially between 70 and 80%. To this end it may be advantageous if the carrier foil is at least half-sidedly crêped in the longitudinal direction.

It is of practical importance to provide the peel-off foil of the sealing tape and/or the carrier foil with perforations or appropriate subdivisions in the longitudinal direction of the sealing tape, because this will make it possible for the sealing tape to be folded and appropriately pre-stretched on one side. The sealing tape does not have to be stretched when it is made to adhere to the pipe jacket, but this becomes necessary in the case of the remaining part of the sealing tape, which is bent away from the pipe jacket in the manner of a flange, and that is the reason why a one-sided elongation or pre-stretching of the sealing tape is advantageous.

In an advantageous embodiment of the invention the sealing tape is provided with a carrier foil made of polyamide that has a coating on a butyl or acrylic base, especially a butyl rubber base. In yet another embodiment, the sealing tape can be provided with reinforcement inlays to increase its tear resistance. The incorporation of checker pattern inserts will be particularly suitable for this purpose. To this end the material and the form of the checker pattern will be so chosen as to enable it to follow the stretching process.

In a practical and advantageous embodiment, the sealing tape will be designed to have a thickness in the range between about 1.5 and 3 mm, and preferably about 2 mm.

It is now proposed to describe a preferred embodiment of the invention with the help of the single FIGURE attached thereto, which albeit in a purely schematic form, illustrates a pipe passage through a vapor barrier foil.

DETAILED DESCRIPTION OF PREFERRED EMBODIMENT

In this FIGURE the reference number 1 designates a cylindrical pipe that passes through a vapor barrier foil 2, the passage being sealed and rendered airtight by means of a sealing tape 3. The longitudinal half of sealing tape 3 designated by the reference number 4 is laid around the barrel jacket of the pipe 1 and made to adhere firmly to said barrel jacket, while the lower longitudinal half of the tape, which in the FIGURE is designated by 5, is bent outwards from the barrel jacket in the manner of a flange and adheres to the vapor barrier foil 2. To this end it is evident that the lower longitudinal half 5 must be appropriately enlarged in order to be able to follow sealing tape section 4, which is laid around the barrel jacket of the pipe, and the radial stretching outwards and away from the barrel jacket. In this case the outer surface of sealing tape 3 that can be seen in the FIGURE is covered by a carrier foil 6, which will be advantageously made of polyamide and, more particularly, transparent polyamide and be designed to have a thickness of 20 μm. The sealing tape itself has a thickness of about 2 mm.

For the purposes of practical use the sealing tape is made available wound onto a roll, where the side of the sealing tape opposite to the carrier foil is covered by a peel-off foil to protect its adhesive surface, though this peel-off foil is not shown in the FIGURE. When the sealing tape is actually to be applied, the user first detaches a length of sealing tape corresponding to the circumference of pipe 1 and then folds it more or less in the area of the center of the sealing tape, so that the part indicated in the FIGURE by the reference number 4 is made to adhere to the barrel jacket and the folded part 5 is made to adhere to vapor barrier foil 2.

The invention claimed is:

1. A vapor barrier wall covering comprising:
   a flat vapor barrier foil having a flat surface and an opening;
   a pipe extending through the opening and projecting from the flat surface of the flat vapor barrier foil;
   the opening being sealed with a sealing tape comprising a base having an adhesive surface on a first side; and
   a carrier foil on a second side of the sealing tape;
   wherein the sealing tape and the carrier foil are stretchable and the sealing tape is adhered to a portion of the flat vapor barrier foil surrounding the opening and to a portion of the pipe projecting from the flat surface of the flat vapor barrier foil;
   whereby the carrier foil can permanently follow a stretched condition of the base that is necessary when the base is adhered to the flat vapor barrier foil, wherein at least a part of the base, in a mounted state, is tensioned as a flat surface.

2. A vapor barrier wall covering in accordance with claim 1, wherein:
   the base has plastoelastic behavior.

3. A vapor barrier wall covering in accordance with claim 2, wherein:
   the base comprises a high plastic component.

4. A vapor barrier wall covering in accordance with claim 1, wherein:
   a stretching capacity of the carrier foil is equal to a stretching capacity of the sealing tape.

5. A vapor barrier wall covering in accordance with claim 1, wherein:
   the carrier foil is made of plastic material.

6. A vapor barrier wall covering in accordance with claim 5, wherein:
   the carrier foil is made of polyethylene.

7. A vapor barrier wall covering in accordance with claim 6, wherein:
   the carrier foil is made of polyamide.

8. A vapor barrier wall covering in accordance with claim 1, wherein:
   the carrier foil has a thickness in the range between 15 and 30 μm.

9. A vapor barrier wall covering in accordance with claim 8, wherein:
   the carrier foil has a thickness in the range between 17 and 22 μm.

10. A vapor barrier wall covering in accordance with claim 9, wherein:
    the carrier foil has a thickness of about 20 μm.

11. A vapor barrier wall covering in accordance with claim 1, wherein:
    the sealing tape and the carrier foil have a stretching capacity in the range between 50 and 100%.

12. A vapor barrier wall covering in accordance with claim 11, wherein:
    the sealing tape and the carrier foil have a stretching capacity in the range between 70 and 80%.

13. A vapor barrier wall covering in accordance with claim 1, wherein:
    at least half a side of the carrier foil in the longitudinal direction is crêped.

14. A vapor barrier wall covering in accordance with claim 1, wherein:
    the base is provided with reinforcing insets in the sealing tape to increase a tear resistance of the base.

15. A vapor barrier wall covering in accordance with claim 14, wherein:
    the reinforcing insets are in a checker pattern.

16. A vapor barrier wall covering in accordance with claim 1, wherein:
    the base has a thickness in the range between 0.5 and 3 mm.

17. A vapor barrier wall covering in accordance with claim 16, wherein:
the base has a thickness of about 2 mm.

18. A vapor barrier wall covering in accordance with claim 1, wherein:
the base comprises butyl or acrylic.

19. A vapor barrier wall covering in accordance with claim 18, wherein:
the base comprises butyl rubber.

20. A vapor barrier wall covering in accordance with claim 1, wherein:
comprises a peel-off strip covering the base to protect the adhesive surface of the tape.

21. A vapor barrier wall covering in accordance with claim 20, wherein:
the base has plastoelastic behavior.

22. A vapor barrier wall covering in accordance with claim 21, wherein:
the base comprises a high plastic component.

23. A vapor barrier wall covering in accordance with claim 20, wherein:
a stretching capacity of the carrier foil is equal to a stretching capacity of the sealing tape.

24. A vapor barrier wall covering in accordance with claim 20, wherein:
the carrier foil is made of plastic material.

25. A vapor barrier wall covering in accordance with claim 24, wherein:
the carrier foil is made of polyethylene.

26. A vapor barrier wall covering in accordance with claim 25, wherein:
the carrier foil is made of polyamide.

27. A vapor barrier wall covering in accordance with claim 20, wherein:
the carrier foil has a thickness in the range between 15 and 30 μm.

28. A vapor barrier wall covering in accordance with claim 27, wherein:
the carrier foil has a thickness in the range between 17 and 22 μm.

29. A vapor barrier wall covering in accordance with claim 28, wherein:
the carrier foil has a thickness of about 20 μm.

30. A vapor barrier wall covering in accordance with claim 20, wherein:
the sealing tape and the carrier foil have a stretching capacity in the range between 50 and 100%.

31. A vapor barrier wall covering in accordance with claim 30, wherein:
the sealing tape and the carrier foil have a stretching capacity in the range between 70 and 80%.

32. A vapor barrier wall covering in accordance with claim 20, wherein:
at least half a side of the carrier foil in the longitudinal direction is crêped.

33. A vapor barrier wall covering in accordance with claim 20, wherein:
the base is provided with reinforcing insets in the sealing tape to increase a tear resistance of the base.

34. A vapor barrier wall covering in accordance with claim 33, wherein:
the reinforcing insets are in a checker pattern.

35. A vapor barrier wall covering in accordance with claim 20, wherein:
the base has a thickness in the range between 0.5 and 3 mm.

36. A vapor barrier wall covering in accordance with claim 35, wherein:
the base has a thickness of about 2 mm.

37. A vapor barrier wall covering in accordance with claim 20, wherein:
the base comprises butyl or acrylic.

38. A vapor barrier wall covering in accordance with claim 37, wherein:
the base comprises butyl rubber.

39. A vapor barrier wall covering in accordance with claim 20, wherein:
the peel-off strip is perforated or subdivided in the longitudinal direction, whereby the base can be pre-stretched on one side.

* * * * *

UNITED STATES PATENT AND TRADEMARK OFFICE
CERTIFICATE OF CORRECTION

| | | |
|---|---|---|
| PATENT NO. | : 7,682,675 B2 | Page 1 of 1 |
| APPLICATION NO. | : 12/025348 | |
| DATED | : March 23, 2010 | |
| INVENTOR(S) | : Birgit Boge | |

It is certified that error appears in the above-identified patent and that said Letters Patent is hereby corrected as shown below:

Column 5
Claim 20, line 12, after "wherein" insert --the sealing tape further--.

Signed and Sealed this

Seventh Day of September, 2010

David J. Kappos
*Director of the United States Patent and Trademark Office*